(No Model.)
J. R. DUNLAP.
COMBINED HARROW AND CULTIVATOR.
No. 303,826. Patented Aug. 19, 1884.
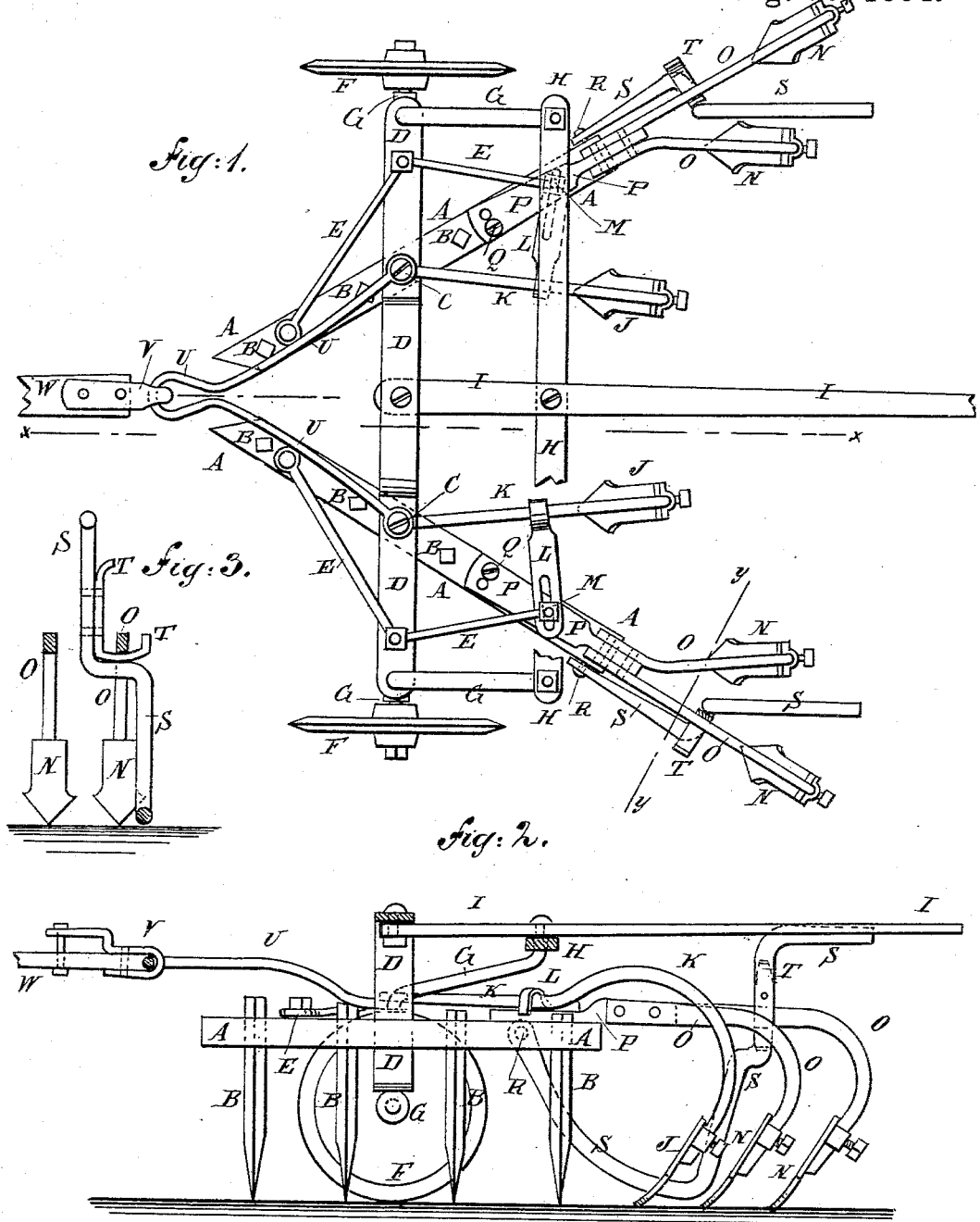
WITNESSES:
INVENTOR:
BY
ATTORNEYS.

UNITED STATES PATENT OFFICE.

JOHN R. DUNLAP, OF SHERMAN, ILLINOIS.

COMBINED HARROW AND CULTIVATOR.

SPECIFICATION forming part of Letters Patent No. 303,826, dated August 19, 1884.

Application filed March 31, 1884. (No model.)

*To all whom it may concern:*

Be it known that I, JOHN R. DUNLAP, of Sherman, in the county of Sangamon and State of Illinois, have invented certain new and useful Improvements in Combined Harrows and Cultivators, of which the following is a full, clear, and exact description.

Reference is to be had to the accompanying drawings, forming part of this specification, in which similar letters of reference indicate corresponding parts in all the figures.

Figure 1 is a plan view of my improvement, parts being broken away. Fig. 2 is a sectional side elevation of the same, taken through the line $x\ x$, Fig. 1. Fig. 3 is a sectional front elevation of a part of the same, taken through the line $y\ y$, Fig. 1.

The object of this invention is to facilitate the cultivation of corn, cotton, and other plants planted in rows when the said plants are small.

The invention consists in the construction and arrangement of parts, as will be hereinafter fully described and claimed.

A are the side beams of the harrow, the forward ends of which are inclined toward each other. The side beams, A, are provided with harrow-teeth B, and are secured at a little distance from their forward end by bolt C to a cross-bar, D, in such position that their forward ends will be at a little distance from each other, so that the plants can pass between the said ends. The side beams, A, are held from turning upon the bolts C by the bent or angular braces E, which are secured at their angles to the projecting end parts of the cross-bar D, and at their ends to the side beams, A, in front and rear of the said cross-bar D. The middle part of the cross-bar D is arched, so that it will pass over plants without injuring them.

F are guide-wheels, which are made thin, so that they will enter the ground. The guide-wheels F are journaled to the lower arms of the crank-axles G, which are pivoted to the ends of the cross-bar D. The upper arms of the crank-axles G extend to the rearward, and to their ends are pivoted the ends of a cross-bar, H. To the center of the cross-bar H is pivoted a lever, I, the forward end of which is pivoted to the center of the cross-bar D. The rear end of the lever I extends to the rearward into such a position that it can be readily reached and operated by the plowman to turn the wheels F to one or the other side, and thus guide the machine.

J are the inner shovels, the forward ends of the beams K of which are secured to the side beams, A, by the bolts C. The beams K are held from lateral movement by the bars L, which have hooks or eyes upon their inner ends to engage with the said beams K. The outer parts of the bars L are slotted longitudinally to receive the bolts M, by which they are secured to the side beams, A, so that the plows J can be adjusted to work at any desired distance from the rows of plants.

N are the outer or rear shovels, the forward ends of the beams O of which are bolted to the opposite sides of the rear ends of the bars P. The bars P at their middle parts are secured to the rear parts of the side beams A, by the bolts M. The forward ends of the bars P are slotted transversely, or provided with slots to receive the bolts Q, that fasten the said ends to the side beams, A, so that by loosening the said bolts Q the shovels N can be moved toward or from the row of plants, as may be required. With this construction the harrow-teeth B break the crust and loosen the soil at the sides of the row of plants, the plows J throw loose soil around the plants, and the plows N cut up and cover the grass and weeds between the rows. To the outer sides of the rear ends of the side beams, A, are pivoted, by bolts R, the forward ends of the bars S, which are curved downward, rearward, and upward, to serve as runners, have inward offsets formed in their upper parts to pass beneath the outer beams, O, and have their upper ends bent rearward and inward to serve as handles. To the upper parts of the bars S, just above their offsets, are attached double hooks or catches T, to receive the outer plow-beams, O, the lower catches serving as gages to limit the depth to which the plows N enter the ground, and the upper catches receiving the plow-beams O and supporting the plows N above the ground when turning around and when passing from place to place.

U is the draw-bail, the ends of which are secured to the side beams, A, by the bolts C. Upon the center of the bail U is formed an eye or loop to receive the clevis V, which is attached to the rear end of the tongue W, and its upper arm is so formed as to serve as a hammer-strap to receive the double-tree.

The bail U and tongue W hold the double-tree from dropping and injuring the plants when the draft is slackened, prevent the horses from getting their feet over the traces when turning, and prevent the horses from backing upon the harrow and being injured.

Having thus described my invention, what I claim as new, and desire to secure by Letters Patent, is—

In a combined harrow and cultivator, the combination of the side beams, A, having harrow-teeth, and the laterally-adjustable bars P, secured to the rear ends of said bars, with the plows O N, secured to the opposite sides of the bars P, and the runners S, pivoted at R to the side beams, A, and bent to form a shoulder, and rearward-extending handles, and double catches T, secured to said runners above said shoulder, substantially as set forth.

JOHN R. DUNLAP.

Witnesses:
EDWIN S. ELKIN,
BARTLY GALLIGAN.